United States Patent
Parham et al.

(10) Patent No.: US 6,643,670 B2
(45) Date of Patent: Nov. 4, 2003

(54) EFFICIENT REPLICATION OF AN EXPANDED PARTIAL DATABASE

(75) Inventors: Jeffrey B. Parham, Redmond, WA (US); Eyal Schwartz, Bellevue, WA (US); William B. Lees, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 275 days.

(21) Appl. No.: 09/793,868

(22) Filed: Feb. 27, 2001

(65) Prior Publication Data

US 2002/0120637 A1 Aug. 29, 2002

(51) Int. Cl.$^7$ .............................................. G06F 17/30
(52) U.S. Cl. ..................... 707/201; 707/10; 707/203; 709/203; 709/219
(58) Field of Search .................. 707/10, 201, 203; 709/203, 219

(56) References Cited

U.S. PATENT DOCUMENTS

| | | | | |
|---|---|---|---|---|
| 5,758,337 A | * | 5/1998 | Hammond | 707/6 |
| 5,829,001 A | * | 10/1998 | Li et al. | 707/10 |
| 6,012,059 A | * | 1/2000 | Neimat et al. | 707/8 |
| 6,243,715 B1 | * | 6/2001 | Bogantz et al. | 707/201 |
| 6,256,634 B1 | * | 7/2001 | Moshaiov et al. | 707/100 |
| 6,374,283 B1 | * | 4/2002 | Chessell et al. | 709/101 |
| 6,457,011 B1 | * | 9/2002 | Brace et al. | 707/10 |
| 6,516,327 B1 | * | 2/2003 | Zondervan et al. | 707/200 |
| 6,529,921 B1 | * | 3/2003 | Berkowitz et al. | 715/500.1 |

OTHER PUBLICATIONS

Cheung, S.Y. et al., "The Grid Protocol: A High Performance Scheme for Maintaining RepLicated Data", *Proc. Of the Sixth Intl. Conference on Data Engineering*, Feb. 5–9, 1990, pp. 438–445.

Dobrovnik, M. et al., "Partial Replication of Object–Oriented Databases", *Advances in Databases and Information Systems, Second Ed.*, 1998, pp. 260–271.

Leung, K.K. et al., "Data Replication Schemes for Global Networks", *Proc. Of the 15*th *International Teletraffic Congress*, Jun. 22–27, 1997, pp. 211–222, Washington, D.C.

\* cited by examiner

*Primary Examiner*—Jean R. Homere
(74) *Attorney, Agent, or Firm*—Woodcock Washburn LLP

(57) ABSTRACT

A replication occurs upon the re-configuration of a partial database to update an additional attribute of an object, and is divided into two sub-requests for replication. The first requests the new attribute from update sequence number zero and the second requests the existing attributes according to their known up-to-date vectors. To facilitate this request, a destination server sends an up-to-date vector table to a source server along with the request for replication. Because the existing attributes are requested from their known up-to-date vectors, rather than from update sequence number zero, this replication request results in less attributes being sent between servers and therefore, provides a more efficient replication.

6 Claims, 3 Drawing Sheets

EFFICIENT REPLICATION OF AN EXPANDED PARTIAL DATABASE

FIELD OF THE INVENTION

The present invention relates generally to a distributed database system, and more particularly to data replication upon re-configuration of a partial database to update an additional attribute of an object in a distributed database.

BACKGROUND OF THE INVENTION

With a distributed database, copies of data objects may exist on several servers and the servers may be geographically dispersed. The objects of the distributed database each include attributes that may be modified on at least some of the servers. However, when a modification is made to an attribute of an object of the database on one of the servers, the copies of the objects in the other servers retain the old data until such copies are updated to reflect the modification. The typical way of updating the copies of the objects in other servers is called replication.

During a replication, a "source" server sends data to a "destination" server, and the destination server updates its database with the objects that were modified. A server is a "source" server or a "destination" server only with reference to a particular replication. For example, a first server may receive data from a second server during a replication. With respect to such replication, the first server is a destination server and the second server is a source server. However, the first server may later send data to a third server during a second replication. With respect to the second replication, the first server is a source server and the third server is a destination server.

A server on which a modification to an object is initially made, rather than an update received through a replication, is referred to as an "originating" server. A server is an "originating" server with respect to a modification, rather than a replication. For example, if an object is modified on a first server, the first server is an originating server with reference to such modification. The originating server may be a source server, a destination server, or neither during a later replication.

To facilitate replication, each server capable of being a source server includes an update sequence number (USN). The USN is a number increasing by at least one for each revision to the database on a server. The USN typically is a monotonically increasing number. The USN of a server may increase upon a modification made on such server (i.e., a modification made on an originating server) or upon receiving an update from a replication.

To facilitate replication, each server includes an up-to-date (UTD) vector table. The UTD vector table includes a data field corresponding to each other server in the networked computer system having a portion of the database. Corresponding to each server in the table, the UTD vector table includes a data field representing a USN of the corresponding server and together, the data fields represent a server-USN pair and represent how up-to-date the server is with respect to the other servers in the system. When a destination server receives data through replication from a source server, such destination server records the highest USN of the source server in the UTD vector table of the destination server. In this manner, each destination server maintains how up-to-date it is with respect to each server acting as a source server to such destination server.

In some cases, a server contains a portion of a database that is a subset of the entire database, the server being referred to herein as a partial replica server. The portion of the database with the subset of the entire database is referred to herein as the partial database. In particular, the partial database may be configure to update only a portion of the attributes of each object of the entire database. For example, a database may contain objects having attributes A, B, C and D. However, the partial database maybe configured to update only attributes A and B. Therefore, such partial database includes only the attributes that such partial database is configured to update (e.g., A and B), and replicates only such attributes during a replication.

A partial replica server updates the partial database in the same way that other servers perform updating, i.e., through replication as described above. For example, the partial replica server (i.e., the server containing the partial database) may replicate attributes A and B but not replicate attributes C and D.

However, when the partial database is re-configured to update an additional attribute, a conventional replication system assumes that all UTD vectors are invalid, and therefore, requests all attributes from a source server from USN zero. USN zero is defined herein as the first USN occurring on a server. Therefore, a request of all attributes from a source server from USN zero, is in fact a request for all revisions on such server. For example, if a partial replica server containing a partial database is originally configured to update attributes A and B, but then is re-configured to update attribute C, the partial replica server requests all revisions to attributes A, B and C from a source server during a replication.

The revision on the server may be from a modification made on such server or from updates received during a replication. This method of requesting all attributes from USN zero may significantly increase the amount of transactions that occur during the replication process. For large databases, this operation may generate excessive network traffic and significant replication and server operational delays, especially if the servers in the computer system are geographically dispersed.

In view of the foregoing, there is a need for a method for allowing for efficient replication to a partial replica server upon re-configuring a partial database to update an additional attribute of an object in a distributed database.

SUMMARY OF THE PRESENT INVENTION

The present invention is directed to systems and methods for efficient data replication upon re-configuration of a partial database to update an additional attribute in a distributed database.

According to aspects of the present invention, a computer system comprises a plurality of servers. A database is distributed across the plurality of servers. The database includes a plurality of objects, each object has a first attribute and a second attribute. Each server periodically replicates values of attributes from another server thereto during a replication.

Each server maintains an increasing update sequence number that is increased upon each revision to the attributes of the objects of the database on such server. Each server maintains an attribute value table that includes for each attribute of each object at such server a value of the attribute for the object, the update sequence number of such server when the value was updated locally or replicated thereto. Each server maintains a vector table that includes for each other server from which the server replicates, the update sequence number of such other server at a time of a most recent replication from such other server. The database at a source server includes the first attribute and the second attribute for each object. The database at a destination server originally includes the first attribute and not the second attribute for each object. The database at the destination server is changed to include the first attribute and the second attribute for each object.

Upon such change, the destination server requests from the attribute value table of the source server, the value of the second attribute for each object at such source server. The destination server receives into the attribute value table thereof, the value of the second attribute for each object at such source server and the current update sequence number of the destination server to be associated with the value. The destination server requests from the attribute value table of the source server, the value of the first attribute for each object at such source server, if the update sequence number of the source server associated with the value in the attribute value table of the source server is greater than the update sequence number associated with the source server in the vector table of the destination server. The destination server receives into the attribute value table thereof, the value of the first attribute for each object at such source server, if the update sequence number of the source server is greater than the update sequence number associated with the source server in the vector table of the destination server.

The above-listed features, as well as other features, of the present invention will be more fully set forth hereinafter.

BRIEF DESCRIPTION OF THE DRAWINGS

The present invention is further described in the detailed description that follows, by reference to the noted drawings by way of non-limiting examples of embodiments of the present invention, in which like reference numerals represent similar elements throughout the several views of the drawings, and wherein.

DETAILED DESCRIPTION OF THE INVENTION

Figure 3:
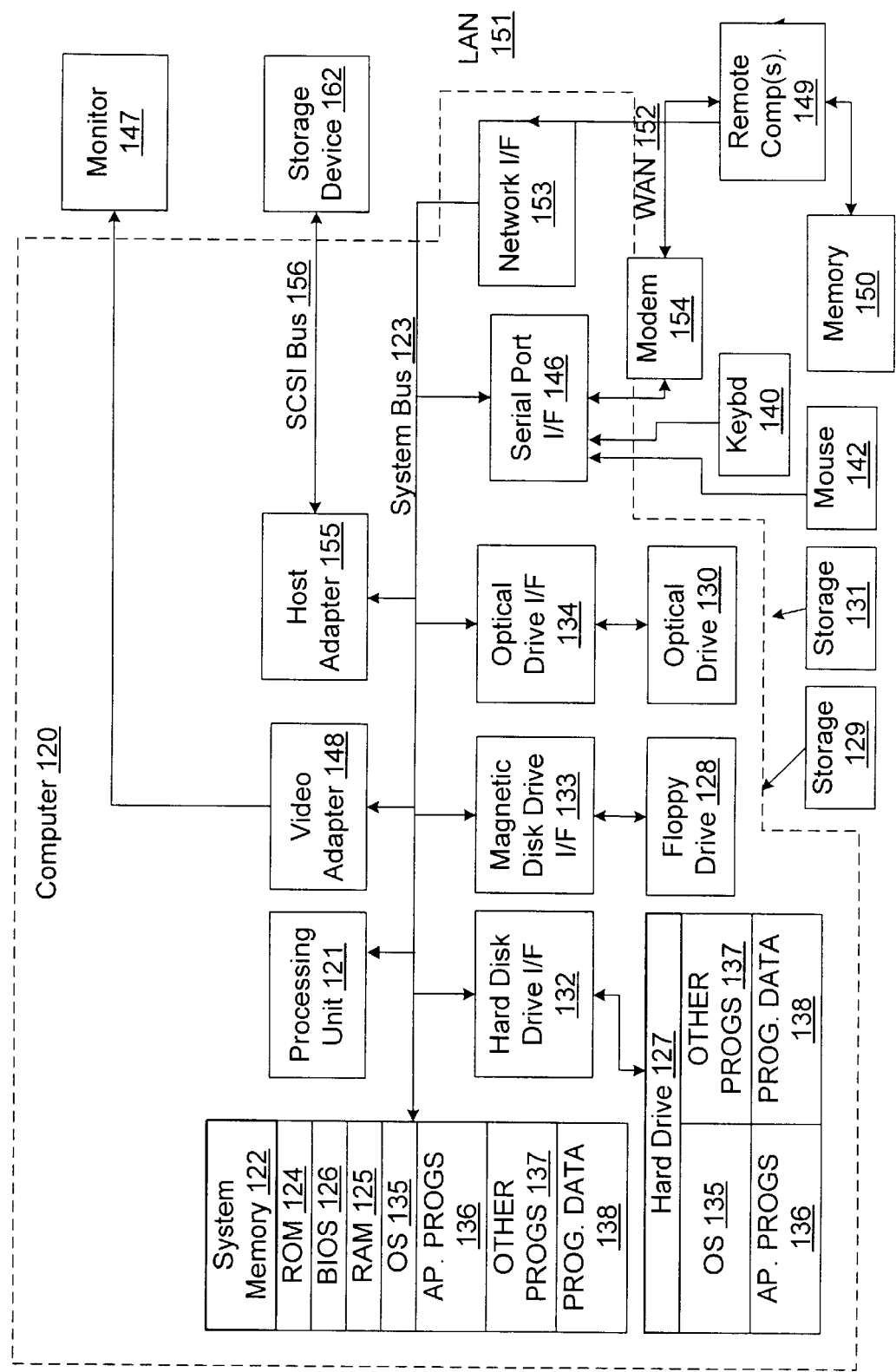
FIG. 3 is a block diagram representing a general purpose computer system in which aspects of the present invention and/or portions thereof may be incorporated.

FIG. 3 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 3, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 120.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 3 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 3. The logical connections depicted in FIG. 3 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, maybe stored in the remote memory storage device. It will be appreciated that the network connections shown are exemplary and other means of establishing a communications link between the computers may be used.

Figure 1:
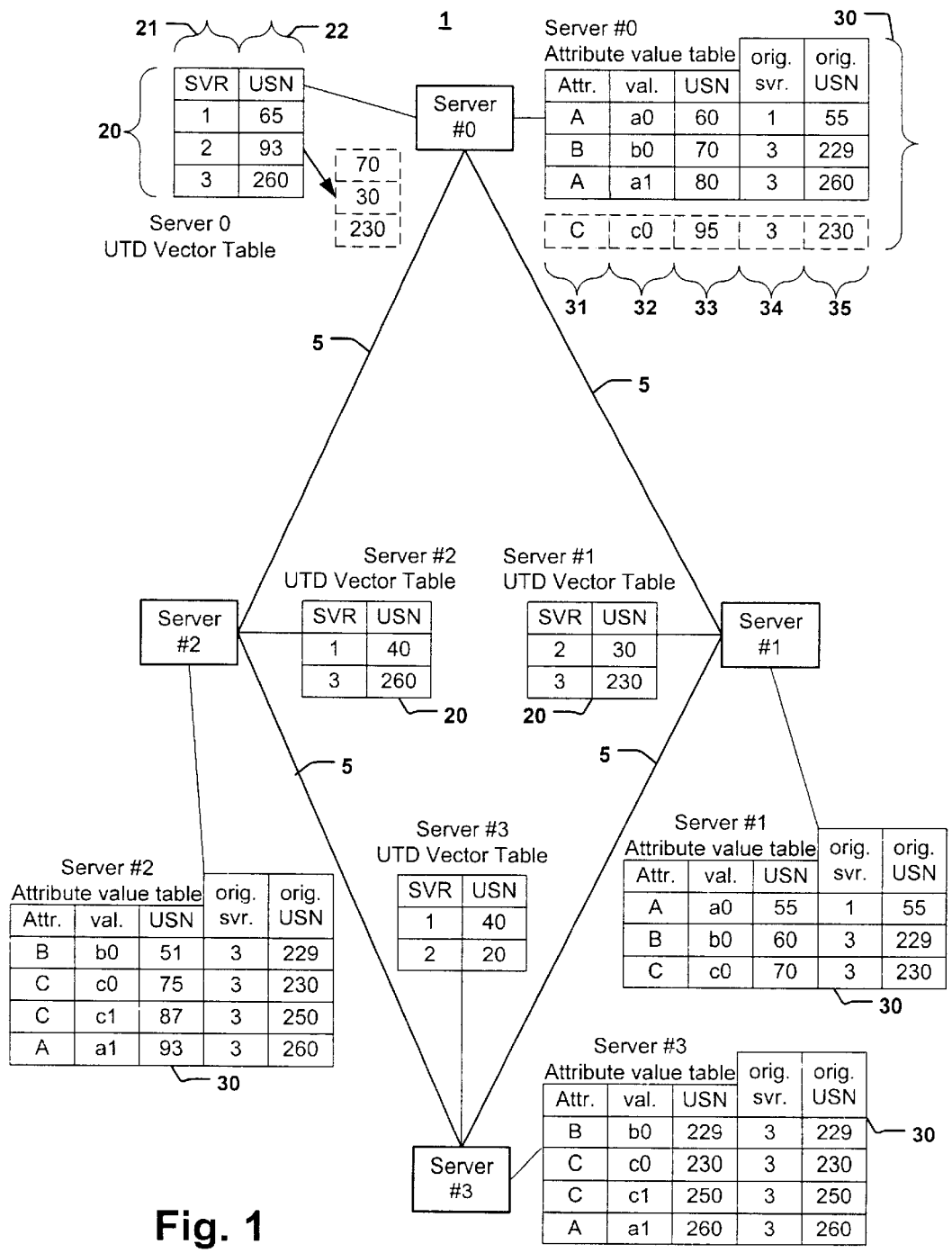
FIG. 1 is a block diagram of an exemplary computer system with a database distributed across several servers, illustrating up-to-date vector tables and attribute values tables, in accordance with one embodiment of the present invention.

FIG. 1 shows an exemplary networked computer system with a database distributed on several servers, and tables illustrating up-to-date vector tables and attribute value tables. As shown in FIG. 1, the computer system 1 includes a plurality of servers (shown as server #0, server #1, server #2, and server #3) interconnected by data links 5.

The servers may be any appropriate server, for example, a central server or a client server, although any particular server may be employed without departing from the spirit and scope of the present invention. Servers are generally known to the relevant public and therefore need not be described herein in any detail.

The data links 5 may be any appropriate data link, for example, a local area network, a wide area network, or the Internet, although any particular data link maybe employed without departing from the spirit and scope of the invention. Data links are generally known to the relevant public and therefore need not be described herein in any detail.

A distributed database resides across the plurality of servers. With a distributed database, copies of the database or portions thereof may exist on several of the servers. The distributed database includes a plurality of objects. Each object includes a plurality of attributes and the plurality of attributes maybe modified from several of the servers. The database maybe any particular type of database without departing from the spirit and scope of the invention. One copy of the database on server #0 is, at least initially, a partial database. A partial database is a database on a server in which the database contains a subset of the attributes of the objects of the database. In one embodiment, the database is a MICROSOFT ACTIVE DIRECTORY directory service (a product of Microsoft Corp. of Redmond, Wash.) and the partial database is a Global Catalog.

The server #0 containing the partial database is referred to herein as a partial replica server. A server containing a complete database is referred to herein as a complete replica server. As shown in FIG. 1, server #1, server #2, and server #3 are complete replica servers.

When a modification is made to an attribute of an object of the database on one of the servers, the copies of the database in the other servers retain old data until the other servers are updated to reflect the modification. Replication is typically used to update the other copies of the databases on the other servers.

As shown in FIG. 1, each server ('the local server') includes an up-to-date (UTD) vector table 20 to facilitate replication. The UTD vector table 20 includes a data field 21 corresponding to each remote server in the networked computer system having a copy of the database from which the local server may obtain copied-to data. Corresponding to each remote server in the table, the UTD vector table 20 includes a data field 22 representing an update sequence number (USN) of the corresponding server and together, the data fields represent a server-USN pair stating how up-to-date the local server is with respect to the remote servers. For example, as shown in FIG. 1, server #0 is up-to-date to USN 65 of server #1, USN 93 of server #2, and USN 260 of server #3.

As shown in FIG. 1, each local server includes an attribute value table 30 to contain attribute values and to facilitate replication. The attribute value table 30 of a local server includes a data field 31 representing an attribute, a data field 32 representing a value of the attribute, a data field 33 representing the USN of the local server when the value was obtained, a data field 34 representing an originating server, and a data field 35 representing the USN of the originating server upon the modification of the value of the attribute at such originating server.

It should be appreciated that not all entries in the attribute value table 30 need to be retained by the local server but are shown for illustrative purposes only. For example, old values associated with an attribute that have been revised may be deleted or over-written. Additionally, it should be appreciated that not all fields in the attribute value table 30 are required in all cases. For example, the data field 35 representing the USN of the originating server upon the modification of an attribute at such originating server is not required in the attribute value table 30 of the originating server because it is identical to the data field 33 representing the USN of such originating server.

In the networked computer system shown in FIG. 1, server #0 is a partial replica server with a partial database, configured to include attributes A and B of each object in such partial database. As shown in FIG. 1, attribute A was modified to value a0 on server #1 at USN 55 of server #1, as shown in the server #1 attribute value table 30. Server #1 replicated the value to server #0 as indicated in the server #0 attribute value table 30 at USN 60 of server #0.

As shown in FIG. 1, attribute A was modified to value a1 on server #3 at USN 260 of server #3, as shown in the server #3 attribute value table 30. Server #3 replicated the value to server #2 as indicated in the server #2 attribute value table 30 at USN 93 of server #2. Server #2 replicated the value to server #0 as indicated in the server #0 attribute value table at USN 80 of server #0.

As shown in FIG. 1, attribute B was modified to value b0 on server #3 at USN 229 of server #3, as shown in the server #3 attribute value table 30. Server #3 replicated the value to server #2 as indicated in the server #2 attribute value table at USN 51 of server #2. Server #3 replicated the value to server #1 as indicated in the server #1 attribute value table 30 at USN 60 of server #1. Either server #1 or server #2 replicated the value to server #0 as indicated in the server #0 attribute value table at USN 70 of server #0. Because server #0 is directly connected to both server #1 and server #2, server #0 may receive data during a replication from either server #1 or server #2.

As shown in FIG. 1, attribute C was modified to value c0 on server #3 at USN 230 of server #3, as shown in the server #3 attribute value table 30. Server #3 replicated this value to server #2 as indicated in the server #2 attribute value table at USN 75 of server #2. Server #3 replicated this value to server #1 as indicated in the server #1 attribute value table at USN 70 of server #1. The attribute was not replicated to server #0 because server #0 does not include attribute C in the partial database, thereat.

As shown in FIG. 1, attribute C was modified to value c1 on server #3 at USN 250 of server #3, as shown in the server #3 attribute value table 30. Server #3 replicated the value to server #2 as indicated in the server #2 attribute value table 30 at USN 87 of server #2. The attribute was not replicated to server #0 because server #0 does not include attribute C in the partial database (at least at this time). The c1 value of attribute C has not as yet been replicated to server #1, as it may take some time for all attributes to be replicated to all complete replica servers.

As shown in FIG. 1, according to the UTD vector table of server #0, server #0 is up-to-date to USN 65 of server #1 (i.e., server #1 previously performed a replication to server #0 at USN 65 of server #1), USN 93 of server #2, and USN 260 of server #3. Server #0 is considered up-to-date to USN 260 of server #3, even though it has not received the values of C modified on server #3 before USN 260 of server #3. This is because server #0 is a partial replica server and is not as yet configured to include attribute C.

Figure 2:
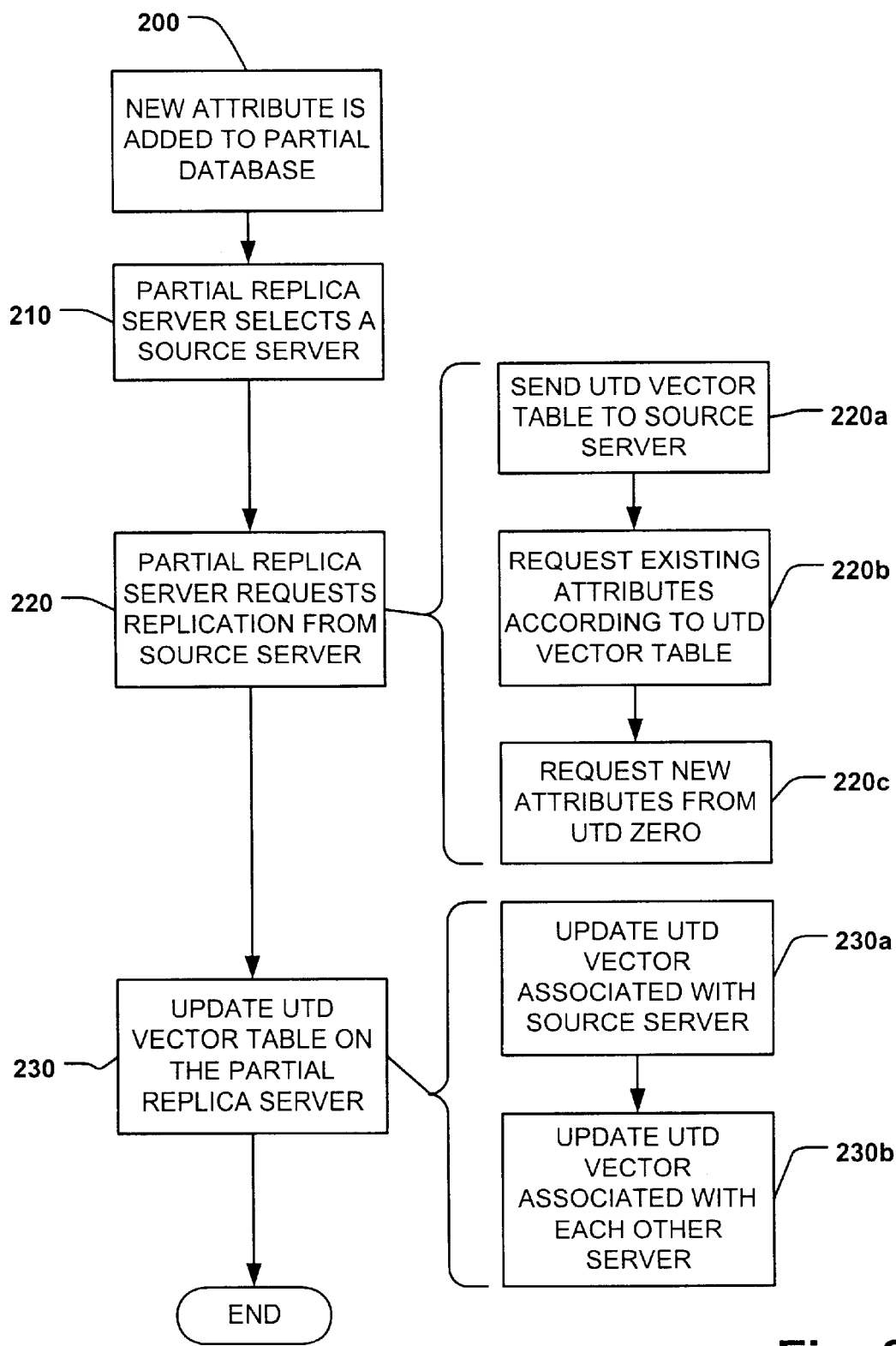
FIG. 2 is a flow diagram of an exemplary replication process in accordance with one embodiment of the present invention.

FIG. 2 is a flow diagram of an exemplary replication process when a new attribute is added to the partial database. As shown in FIG. 2, as step 200, a new attribute is added to the partial database. In the exemplary networked computer system of FIG. 1, attribute C is added to the partial database of server #0. Upon addition of a new attribute to the partial database, the partial replica server #0 eventually initiates a replication to obtain values for the new attribute. For example, when new attribute C is added to the partial database of server #0, server #0 initiates a replication to populate the new attribute C with values.

As shown in step 210, the partial replica server selects a source server for replication. A desired source for replication is a source server in which there is a good probability that the replication will complete relatively smoothly and quickly. An intra-network site, if available, is desired over an inter-network site. A read-write source is desired over a read-only source. An Internet Protocol (IP) transport is desired over a Simple Mail Transfer Protocol (SMTP) transport. As shown in FIG. 1, server #0 may select to replicate from either server #1 or server #2.

As shown in step 220, the partial replica server requests replication from the selected source server. In the example of FIGS. 1 and 2, the partial replica server is server #0 and the selected source server is server #1.

As shown in step 220b and 220c, a replication that occurs upon the addition of an attribute to a partial database is divided into two sub-requests for replication. The first requests the existing attributes already present at server #0 according to known UTD vectors, shown at step 220b, and the second requests the new attribute, newly present at server #0, from USN zero, shown at step 220c. To facilitate the request, the destination server (i.e., server #0) sends the UTD vector table 20 thereof to the source server (i.e., server #1) with the request for replication, as shown at step 220a. Because the existing attributes are requested from known UTD vectors, rather than from UTD zero, the replication request likely results in less data being sent from the source server to the destination server and therefore, likely provides a more efficient replication.

In the example shown in FIG. 1, if server #0 replicates from server #1, then server #0 sends the UTD vector table 20 of the server #0 to server #1, at step 220a. Server #0 requests all revisions to attributes A and B later than (i.e., larger than) USN 65 of server #1, USN 93 of server #2, or USN 260 of server #3, at step 220b. Server #0 requests all revisions to attribute C later than (i.e., larger than) USN zero of any server.

As a result, server #1 sends server #0 the value for attribute C, c0, as obtained at USN 70 of server #1, and as originating at USN 230 of originating server #3. It should be noted that server #1 does not send the value of c1 to server #0, because server #1 has not been updated to reflect the revision of attribute C to the value of c1.

As shown in step 230, the UTD vector table 20 on the partial replica server (server #0) is updated to reflect the replication. In particular, the UTD value (i.e., USN) corresponding to server #1 is updated to reflect the replication from server #1. However, because the partial replica server has not previously replicated the value for the new attribute C, the partial replica server must take special care to adjust the UTD values for the other servers (server #2, server #3) in the UTD vector table 20 on the partial replica server (server #0).

In particular, and as is seen in FIG. 1 at step 230a, the USN corresponding to the source server (server #1) in the UTD vector table 20 of the destination server (server #0) is updated to the current USN of the source server (server #1), in a manner similar to that in connection with a conventional replication. In a conventional replication, the UTD vector table 20 of the destination server is updated such that the USN corresponding to each server in the UTD vector table 20 is updated to the largest USN corresponding to such server received during the replication. In the example of FIG. 1, the USN corresponding to server #1 in the UTD vector table 20 of server #0 is set to the value of 70, from the value of 65.

Importantly, in the present invention, the remaining USNs in the UTD vector table 20 of the destination server (server #0) are set according to the UTD vector table 20 of the source server (server #1), as shown in step 230b. In the example of FIG. 1, the USN corresponding to server #2 in the UTD vector table 20 of server #0 is set to the value of 30, from the value of 93. Additionally, the USN corresponding to server #3 in the UTD vector table 20 of server #0 is set to the value of 230, from the value of 260.

The destination server (server #0) obtains the USN associated with each server (server #2 and server #3) for the UTD vector table 20 of the source server (server #1), and stores each obtained USN as the USN associated with the respective server (server #2 and server #3) in the UTD vector table 20 of the destination server (server #0). In this manner, the USNs are rolled back and in future replications from server #2 and server #3, the destination server (server #0) eventually receives all the updates to the value of the new attribute C.

To illustrate why this occurs, it is seen in FIG. 1, that prior to the replication, server #0 was up-to-date to USN 260 of server #3. However, server #0 was not previously asking for replications regarding values of attribute C, because server #0 was replicating values for attributes A and B only. Significantly, modifications to attribute C may have occurred between USN 230 of server #3 and USN 260 of server #3. In fact, in the example of FIG. 1, attribute C was modified on server #3 at USN 250 of server #3. If server #0 does not revise the UTD vector table 20 on server #0, server #0 may never receive the modification to attribute C at USN 250 of server #3 during a replication with such server #3 because according to the UTD vector table 20 of server #0, server #0 is up-to-date to USN 260 of server #3.

Likewise, and with respect to server #2, prior to the replication, server #0 was up-to-date to USN 93 of server #2. However, server #0 was not previously asking for replications regarding values of attribute C, because server #0 was replicating values for attributes A and B only. Significantly, modifications to attribute C may have occurred prior to USN 93 of server #2. In fact, in the example of FIG. 1, attribute C was modified on server #3 at USN 250 of server #3, and was replicated to server #2 at USN 87 of server #2. If server #0 does not revise the UTD vector table 20 on server #0, server #0 may never receive the modification to attribute C at USN 87 of server #2 during a replication with such server #2 because according to the UTD vector table 20 of server #0, server #0 is up-to-date to USN 93 of server #2.

In this manner, when server #0 replicates from server #2 at a later time, server #0 will receive the value of c1, at USN 87 of server #2. If server #0 had not revised the UTD vector table 20 of server #0, server #0 would not have received the value of c1 from server #2, because server #0 would have requested all revisions from USN 93 of server #2 and onward. Since, the value of c1 was received at USN 87 of server #2, server #0 would not have received the value of c1.

In sum, by rolling back the USNs for server #2 and server #3 in the UTD vector table 20 of server #0, server #0 is ensured of getting all updates to the value of attribute C from such server #2 and/or server #3 during future replications therewith. Note that rolling back may cause duplication of updates to values of attributes other than attribute C. Nevertheless, such duplications are acceptable in view of the alternative, complete replication from a server from USN zero.

The present invention may be embodied in the form of program code (i.e., instructions) stored on a computer-readable medium, such as a magnetic, electrical, or optical storage medium, including without limitation a floppy diskette, CD-ROM, CD-RW, DVD-ROM, DVD-RAM, magnetic tape, flash memory, hard disk drive, or any other machine-readable storage medium, wherein, when the program code is loaded into and executed by a machine, such as a computer, the machine becomes an apparatus for practicing the invention. The present invention may also be embodied in the form of program code that is transmitted over some transmission medium, such as over electrical wiring or cabling, through fiber optics, over a network, including the Internet or an intranet, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

It is noted that the foregoing examples have been provided merely for the purpose of explanation and are in no way to be construed as limiting of the present invention. While the invention has been described with reference to exemplary embodiments, it is understood that the words which have been used herein are words of description and illustration, rather than words of limitations. Further, although the invention has been described herein with reference to particular embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed is:

1. A method in combination with a computer system comprising:

a plurality of servers; and
   a database distributed across the plurality of servers, the database including a plurality of objects, each object having a first attribute and a second attribute,
   each server periodically replicating values of attributes from another server thereto during a replication,
   each server maintaining an increasing update sequence number that is increased upon each revision to the attributes of the objects of the database on such server,
   each server maintaining an attribute value table that includes for each attribute of each object at such server a value of the attribute for the object, the update sequence number of such server when the value was revised,
   each server maintaining a vector table that includes for each other server from which the server replicates, the update sequence number of such other server at a time of a most recent replication from such other server,
   wherein the database at a source server includes the first attribute and the second attribute for each object,
   wherein the database at a destination server originally includes the first attribute and not the second attribute for each object, and
   wherein the database at the destination server is changed to include the first attribute and the second attribute for each object,
   the method comprising, upon such change:
      requesting, by the destination server from the attribute value table of the source server, the value of the second attribute for each object at such source server;
      receiving, by the destination server into the attribute value table thereof, the value of the second attribute for each object at such source server and the current update sequence number of the destination server to be associated with the value;
      requesting, by the destination server from the attribute value table of the source server, the value of the first attribute for each object at such source server, if the update sequence number of the source server associated with the value in the attribute value table of the source server is greater than the update sequence number associated with the source server in the vector table of the destination server;
      receiving, by the destination server into the attribute value table thereof, the value of the first attribute for each object at such source server, if the update sequence number of the source server is greater than the update sequence number associated with the source server in the vector table of the destination server.

2. The method of claim 1 further comprising obtaining a current update sequence number of the source server and storing the obtained update sequence number in the vector table of the destination server in association with the source server.

3. The method of claim 1 further comprising obtaining each update sequence number associated with each server in the vector table of the source server, and storing each obtained update sequence number as the update sequence number associated with the corresponding server in the vector table of the destination server.

4. A computer-readable medium having computer-executable modules/components thereon for replication of a distributed database in a computer system, the computer system comprising:

a plurality of servers; and a database distributed across the plurality of servers, the database including a plurality of objects, each object having a first attribute and a second attribute, each server periodically replicating values of attributes from another server thereto during a replication, each server maintaining an increasing update sequence number that is increased upon each revision to the attributes of the objects of the database on such server, each server maintaining an attribute value table that includes for each attribute of each object at such server a value of the attribute for the object, the update sequence number of such server when the value was revised, each server maintaining a vector table that includes for each other server from which the server replicates, the update sequence number of such other server at a time of a most recent replication from such other server, wherein the database at a source server includes the first attribute and the second attribute for each object, wherein the database at a destination server originally includes the first attribute and not the second attribute for each object, and wherein the database at the destination server is changed to include the first attribute and the second attribute for each object, the modules/components performing upon such change, the steps of:

requesting, by the destination server from the attribute value table of the source server, the value of the second attribute for each object at such source server;

receiving, by the destination server into the attribute value table thereof, the value of the second attribute for each object at such source server and the current update sequence number of the destination server to be associated with the value;

requesting, by the destination server from the attribute value table of the source server, the value of the first attribute for each object at such source server, if the update sequence number of the source server associated with the value in the attribute value table of the source server is greater than the update sequence number associated with the source server in the vector table of the destination server;

receiving, by the destination server into the attribute value table thereof, the value of the first attribute for each object at such source server, if the update sequence number of the source server is greater than the update sequence number associated with the source server in the vector table of the destination server.

5. The computer readable medium of claim 4 further comprising the step of obtaining a current update sequence number of the source server and storing the obtained update sequence number in the vector table of the destination server in association with the source server.

6. The computer readable medium of claim 4 further comprising the step of obtaining each update sequence number associated with each server in the vector table of the source server, and storing each obtained update sequence number as the update sequence number associated with the corresponding server in the vector table of the destination server.

* * * * *